United States Patent [19]
Schaeff

[11] 3,841,655
[45] Oct. 15, 1974

[54] SPRING SUSPENSION FOR MOTOR VEHICLE AXLES

[75] Inventor: Friedrich Schaeff, Benshein-Auerbach, Germany

[73] Assignee: Otto Sauer Achsenfabrik, Keilberg uber Aschaffenburg, Germany

[22] Filed: June 1, 1973

[21] Appl. No.: 366,007

Related U.S. Application Data
[63] Continuation-in-part of Ser. No. 214,221, Dec. 30, 1971.

[30] Foreign Application Priority Data
June 19, 1972 Germany.......................... 2229663

[52] U.S. Cl. ............................ 280/124 R, 267/54 R
[51] Int. Cl............................................. B60g 11/12
[58] Field of Search............. 267/124 R, 31, 41, 45, 267/47, 52–56

[56] References Cited
UNITED STATES PATENTS
3,434,707  3/1969  Raidel.................................. 267/31
3,493,222  2/1970  Mathers............................... 267/54

Primary Examiner—Philip Goodman
Attorney, Agent, or Firm—Edwin E. Greigg

[57] ABSTRACT

In a resilient axle suspension there is provided, on each side of the vehicle, an axle bracket formed of a first of conventional leaf spring and a second or parabolic leaf spring substantially parallel with the conventional leaf spring. In each axle bracket, at one end the springs are rigidly clamped to one another and to an axle tube, whereas at the other end both springs form an eye. The conventional spring — having a uniform thickness along its length — is attached at its eye end to the chassis to swing about a pivot without clearance and the parabolic spring — having a thickness increasing along its length towards the axle tube — is connected at its eye end to the eye end of the conventional spring to swing about the same pivot with the possibility of a linear forward and rearward shift with respect to the conventional spring. Each axle bracket is improved to include support surfaces formed on the parabolic leaf spring, with the support surfaces abutting against the eye of the conventional leaf spring.

11 Claims, 3 Drawing Figures

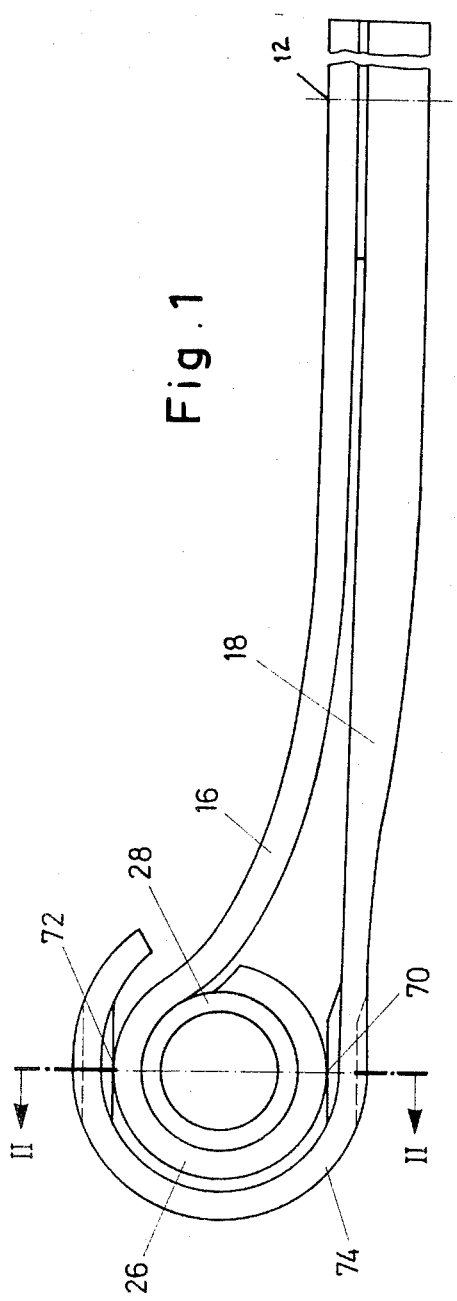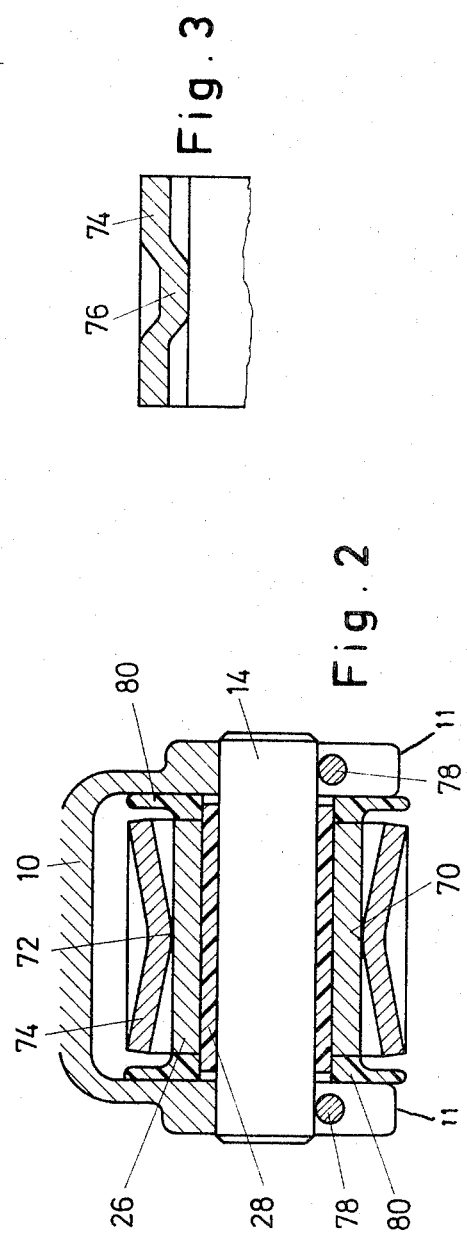

SPRING SUSPENSION FOR MOTOR VEHICLE AXLES

CROSS-REFERENCE TO RELATED APPLICATION

This application is a continuation-in-part of applicant's copending U.S. Pat. application Ser. No. 214,221, entitled "Spring Sustension For Motor Vehicle Axles" and filed on Dec. 30, 1971.

BACKGROUND OF THE INVENTION

This invention relates to a resilient axle suspension for motor vehicles wherein the axle body — usually an axle tube — is secured to two longitudinal axle brackets which are situated at either side of the vehicle axis and each of which is formed of at least two leaf springs.

According to the aforenoted parent application such an axle suspension is designed in such a way that one of the leaf springs of each axle bracket has a constant moment of resistance along its effective length and is articulated to the main vehicle body by means of a hinge-type joint and has a pivot axis, which is normal to the central plane of the vehicle. Further, a second leaf spring of each axle beacket is a parabolic spring having a moment of resistance that decreases toward the hinge-type articulation. The parabolic spring is supported in the range of the axle bracket articulation in such a manner that it is capable of transmitting at that location vertical forces and forces transverse to the longitudinal axis of the vehicle, but at the same time, by means of a corresponding play at its support location, avoids the torsional forces acting about the longitudinal direction of the axle bracket.

In the design according to the aforenoted parent application a play between the conventional leaf spring and the parabolic spring in the region of the pivot pin is achieved by the air space or clearance provided. Such a design, where the two springs are completely freely movable at the pivot pin with respect to one another, is disadvantageous when, for example, bad roads are traversed, because under certain load conditions the two springs impinge upon each other so that a rattling noise is generated.

OBJECTS AND SUMMARY OF THE INVENTION

It is, therefore, a general object of the present invention to provide an improved axle bracket of the aforenoted type.

It is a more specific object of the present invention to provide an improved axle bracket which eliminates the rattling noise referred to above without limiting the mobility of the articulated link.

These and other objects are accomplished according to the present invention by the provision of a resilient axle suspension for motor vehicles wherein the axle body — usually an axle tube — is secured to two longitudinal axle brackets which are situated at either side of the vehicle axis and each of which is formed of at least two leaf springs, one of the leaf springs of each axle bracket forming a guide spring having a constant moment of resistance along its effective length, being articulated to the main vehicle body by means of a hinge-type joint and having a pivot axis which is normal to the central plane of the vehicle, with one end of the spring being developed as a spring eye which encircles a link pin of the hinge-type joint; and the other or second leaf spring of each axle bracket being a parabolic spring having a moment of resistance that decreases towards the hinge-type articulation with one end thereof being developed to envelop the spring eye so that it is capable of transmitting vertical forces at that location while at the same time avoiding the torsional forces acting about the longitudinal direction of the axle bracket.

Such a resilient axle suspension is distinguished according to the present invention in that support surfaces are formed on that end of each parabolic spring which surrounds the spring eye of its respective guide spring, which contact the spring eye without play. The desire for mobility of the parabolic spring in its longitudinal direction while avoiding torsional motion can advantageously be achieved giving the support surfaces a V-shaped or bead-shaped cross section. In this way the transmission of substantial torsional moments to the link pin is avoided.

According to a further development of the present invention, a clamping fixture is provided in order to facilitate the assembly and to achieve a firm seating of the link pin in the chassis of the vehicle. This fixture includes clamping bearings for the link pin, each of which is radially slit and appropriate clamping screws which are disposed so that the screws are tangential to the link pin. In this way it is possible to guarantee an additional securing if the clamping screws are insufficiently tightened.

Advantageously there are disposed annular discs, made preferably of polyamide, which are located, as seen in the axial direction of the link pin, coaxial with the link pin and between the side edges of the guide spring and the chassis of the vehicle. These discs are utilized to accomplish transfer of axial forces occurring at the axle, primarily during turning maneuvers, through the guide springs and to the chassis of the vehicle.

A bearing bushing or cylindrical bearing sleeve which is located between the spring eye of the guiding or conventional spring and the link pin is suitably longer that the width of the spring eye. In this way the specific bearing loading between the bearing sleeve and the link pin is as low as is possible. The extended ends of the bearing sleeve accept the above-mentioned polyamide axial disks.

This arrangement is advantageous in that during assembly, the leaf springs and the polyamide axial disks, which are slipped on the bearing sleeve, can be installed on the chassis of the vehicle as one unit, so that subsequently only the link pin need be pushed into the bearing sleeve. At the same time, this arrangement results in a labyrinth-like seal between the spring eye and the link pin so that, to a large extent, dirt is kept from the bearing sleeve.

BRIEF DESCRIPTION OF THE DRAWINGS

FIG. 1 is side elevational view illustrating a guide linkage in the form of a swinging bracket according to the present invention;

FIG. 2 is a sectional view taken along the line II—II of FIG. 1 illustrating further details of a particular exemplary embodiment of the bearing sleeve according to the present invention; and FIG. 3 is a view in cross section of a parabolic spring at the position of FIG. 2 illustrating another cross sectional form of the spring according to the present invention.

DESCRIPTION OF THE PREFERRED EMBODIMENTS

Turning now to a more specific consideration of the present invention as exemplarily illustrated in FIGS. 1-3, there is shown a resilient axle suspension system for vehicles including a guide or conventional spring 16, a parabolic spring 18, a bearing sleeve 28 and a pivot pin 14. The guide spring 16 forms a spring eye 26 which surrounds the bearing sleeve 28, and the parabolic spring 18 forms a spring eye 74. The guide spring 16 and the parabolic spring 18 are clamped together at their end remote from the pivot pin 14. This is shown schematically by the center line 12.

To the end 14 of the parabolic spring 18, support surfaces 70 and 72 are formed. The surfaces 70 and 72 abut against the eye 26 without any or without any substantial play.

In order to produce the support surfaces, the wrap around or spring eye end 74 is transversely deformed, according to one preferred embodiment, at its vertically highest and lowest portion, in the vertical direction of the vehicle as seen most clearly in FIG. 2, to form V-shaped cross sections. The portions of the end 74, which are shown in FIG. 1 are disposed above and below the pivot pin 14. In the embodiment illustrated in FIG. 3, the two portions form a transverse deformation in the form of a rib 76. The apexes of these two ribs 76 or of the V-shaped cross sectional portions extend parallel to each other and substantially horizontally as is clearly visible in FIG. 1. This arrangement makes it possible for the parabolic spring 18 to move not only in a longitudinal direction but also about its longitudinal axis without being torsionally deformed. Also, no substantial torsional moments are transferred to the pivot pin 14.

The pivot pin 14 is fastened to the main body or chassis 10 of the vehicle by clamps in order to achieve ease of assembly and firm seating of the pin 14. For this purpose pin bearings 11 and the clamping screws 78 are provided. The bearings 11 are radially slit and the preferably two clamping screws 78 are disposed so that they are tangential to the pivot pin 14. Having the screws 78 extend tangentially, offers additional security to the assembly even in the event that the clamping screws, or one of the clamping screws, should be insufficiently tightened.

A pair of discs 80 of firm synthetic material, preferably of polyamide, are provided in assembly (FIG. 2). These discs serve as load bearing and sealing members.

In general, the support surfaces 70 and 72 may be ribs, beads or knife edges, which are located in the longitudinal center of the parabolic leaf spring and which abut against the middle of the spring eye 26. The axial forces occurring at the axle (not shown), especially during turning maneuvers, are transmitted through the guide spring 16 and across the axial discs 80 to the main body or chassis 10 of the vehicle. In order to achieve as low a specific bearing loading as possible between the bearing sleeve 28 and the pivot pin 14, the length of the bearing sleeve 28 is made greater than the width of the spring eye 26. Axial disks 80 are mounted on the overhanging or extending ends of the bearing sleeve.

With this installation and with these relative dimensions between elements it is possible to pre-assemble the spring package, including the two springs 16, 18, the sleeve 28 and the added axial disks 80, and to place it into the main body unit 10 as a unit, after which only the pivot pin 14 needs to be inserted through the sleeve 28.

The axial disks 80 further achieve a labyrinth-like seal between the spring eye 26 and the pivot pin 14 so that dirt is largely kept away from the sleeve 28. The sleeve 28 consists of a material customarily used for such bearings, e.g. hardened stell, bronze or plastics.

What is claimed is:

1. In a spring suspension for an axle of a motor vehicle having a chassis and an axle body spaced therefrom, the spring suspension comprising:
   A. a hinge means secured to said chassis on either side of the longitudinal central axis of the vehicle, each said hinge means including a pivot pin defining an axis normal to said central axis; and
   B. an axle bracket situated on either side of the longitudinal central axis of the vehicle and extending in the length dimension thereof, each axle bracket having:
      1. a first or conventional leaf spring of constant moment of resistance along its effective length, said conventional leaf spring forming at one end thereof an eye which surrounds a respective one of said pivot pins, and being attached through said eye to said hinge means for pivotal motion about the normal axis associated with said respective one of said pivot pins; and
      2. a second or parabolic leaf spring of decreasing moment of resistance along its length towards said hinge means, said parabolic leaf spring forming at one end thereof an eye which envelops the eye of its respective conventional leaf spring in such a way that at least a horizontal clearance is established, so that, in the length dimension of the vehicle, a shift of said parabolic spring in said hinge means is permitted in response to torsional forces acting about the length dimension of said axle bracket, said parabolic spring transmitting in said hinge means vertically directed forces,
      the improvement in each axle bracket comprising support surfaces formed on the eye of said parabolic leaf spring, with said support surfaces abutting against the eye of said conventional leaf spring.

2. An improvement as defined in claim 1, wherein said support surfaces when in abutment against the eye of said conventional leaf spring substantially prevent play in the vertical direction of the vehicle.

3. An improvement as defined in claim 1, wherein two support surfaces in approximate diametral relation in the vertical direction of the vehicle are provided.

4. An improvement as defined in claim 1, wherein said support surfaces are formed as an integral part of the eye of said parabolic spring in such a way that, when viewed in cross section, the eye expands in the vertical direction of the vehicle from the central longitudinal plane of the parabolic spring to its lateral sides.

5. An improvement as defined in claim 1, wherein the formed support surfaces define a deformation of the eye along an approximately central longitudinal plane of said hinge means.

6. An improvement as defined in claim 5, wherein said formed support surfaces have V-shaped cross sections.

7. An improvement as defined in claim 5, wherein said formed support surfaces each has a cross section defining a bead.

8. An improvement as defined in claim 5, wherein said formed support surfaces each has a cross section defining a rib.

9. An improvement as defined in claim 5, wherein said formed support surfaces each has a cross section defining a knife edge.

10. An improvement as defined in claim 1, wherein the improvement in each axle bracket further comprises a bearing sleeve and a pair of axial discs, said bearing sleeve being mounted between the pivot pin and the eye of said conventional leaf spring and being longer than the width of the eye, with said axial discs being mounted to the extended portions of said bearing sleeve.

11. An improvement as defined in claim 1, wherein the improvement in each axle bracket further comprises clamping bearings fastened to the vehicle chassis within which the pivot pin is fastened.

* * * * *